(12) United States Patent
Miyahara (10) Patent No.: US 10,084,943 B2
(45) Date of Patent: Sep. 25, 2018

(54) IMAGE PROCESSING APPARATUS THAT GENERATES A PRINT PREVIEW BASED ON SPECIAL COLOR MATERIALS

(71) Applicant: Seiji Miyahara, Chiba (JP)

(72) Inventor: Seiji Miyahara, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/451,331

(22) Filed: Mar. 6, 2017

(65) Prior Publication Data
US 2017/0264789 A1    Sep. 14, 2017

(30) Foreign Application Priority Data

Mar. 9, 2016  (JP) .................................. 2016-046093

(51) Int. Cl.
*H04N 1/60* (2006.01)
*H04N 1/00* (2006.01)
*H04N 1/56* (2006.01)

(52) U.S. Cl.
CPC ......... *H04N 1/6011* (2013.01); *H04N 1/0044* (2013.01); *H04N 1/56* (2013.01); *H04N 1/6097* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,161,829 A * | 11/1992 | Detrick | ................... | B32B 29/06 |
| | | | | 156/277 |
| 6,724,912 B1 * | 4/2004 | Carr | ................... | G06K 9/00442 |
| | | | | 382/100 |
| 8,059,982 B2 * | 11/2011 | Carlson | .............. | G03G 15/2064 |
| | | | | 399/342 |
| 8,259,372 B2 * | 9/2012 | Suzuki | .................. | H04N 1/0035 |
| | | | | 358/1.18 |
| 8,264,742 B2 * | 9/2012 | Koyano | ................ | G06F 3/1243 |
| | | | | 358/1.14 |
| 9,368,010 B2 * | 6/2016 | Kim | .................... | G08B 13/2431 |
| 2006/0262367 A1 * | 11/2006 | Hattori | ..................... | B41M 3/14 |
| | | | | 359/15 |

(Continued)

FOREIGN PATENT DOCUMENTS

JP  4960840  3/2012
JP  2016-048456  4/2016

*Primary Examiner* — Miya J Williams
(74) *Attorney, Agent, or Firm* — Duft Bornsen & Fettig LLP (57) ABSTRACT

An image processing apparatus includes a normal print order setter, a multiple print order and base material setter, and a preview image generator. The normal print order setter is configured to set types of color materials used in printing document data on a base material, and order of overlaying of the color materials during printing. The multiple print order and base material setter is configured to set at least one of a number of repetitions of printing based on the types of color materials and the order of overlaying of the color materials and a type of base material. The preview image generator is configured to generate a preview image simulating a print result of the document data on a basis of information set by the normal print order setter and the multiple print order and base material setter.

4 Claims, 7 Drawing Sheets

(56) References Cited

U.S. PATENT DOCUMENTS

| | | | |
|---|---|---|---|
| 2007/0146469 A1* | 6/2007 | Takizawa | B41J 3/46 |
| | | | 347/212 |
| 2007/0146470 A1* | 6/2007 | Takizawa | B41J 3/407 |
| | | | 347/212 |
| 2009/0109457 A1* | 4/2009 | Koyano | G06F 17/243 |
| | | | 358/1.9 |
| 2009/0303504 A1* | 12/2009 | Iinuma | G03G 15/04018 |
| | | | 358/1.9 |
| 2016/0063765 A1 | 3/2016 | Yoshida et al. | |

\* cited by examiner

IMAGE PROCESSING APPARATUS THAT GENERATES A PRINT PREVIEW BASED ON SPECIAL COLOR MATERIALS

CROSS-REFERENCE TO RELATED APPLICATIONS

The present application claims priority under 35 U.S.C. § 119 to Japanese Patent Application No. 2016-046093, filed Mar. 9, 2016. The contents of which are incorporated herein by reference in their entirety.

BACKGROUND OF THE INVENTION

1. Field of the Invention

The present invention relates to an image processing apparatus, an image processing system, an image processing method, and a computer-readable recording medium.

2. Description of the Related Art

A print preview technique for previously displaying a print result of document data printed with color materials, such as toner and ink, on a base material (printing substrate), such as a paper medium, a transparent film, or a cloth medium, by using an image forming apparatus, such as a printer, on-screen on a display device, such as a display, has been known. Such a conventional print preview technique can be used, for example, to preview a print result when the position or lighting direction of a light source is changed.

Some print processes perform transfer and fixing a plurality of times by using special color materials (such as white toner and clear toner) as well as CMYK (cyan, magenta, yellow, and black) process colors. A print result of such print processes has been unable to be previewed by the conventional print preview technique before actual printing.

SUMMARY OF THE INVENTION

According to one aspect of the present invention, an image processing apparatus includes a normal print order setter, a multiple print order and base material setter, and a preview image generator. The normal print order setter is configured to set types of color materials used in printing document data on a base material, and order of overlaying of the color materials during printing. The multiple print order and base material setter is configured to set at least one of a number of repetitions of printing based on the types of color materials and the order of overlaying of the color materials and a type of base material. The preview image generator is configured to generate a preview image simulating a print result of the document data on a basis of information set by the normal print order setter and the multiple print order and base material setter.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to generate a preview image simulating a print result according to various print conditions, namely, the types of color materials, the order of overlaying of the color materials, the number of repetitions of printing, and the type of base material.

Description of Hardware Configuration of Image Processing System

Figure 1:
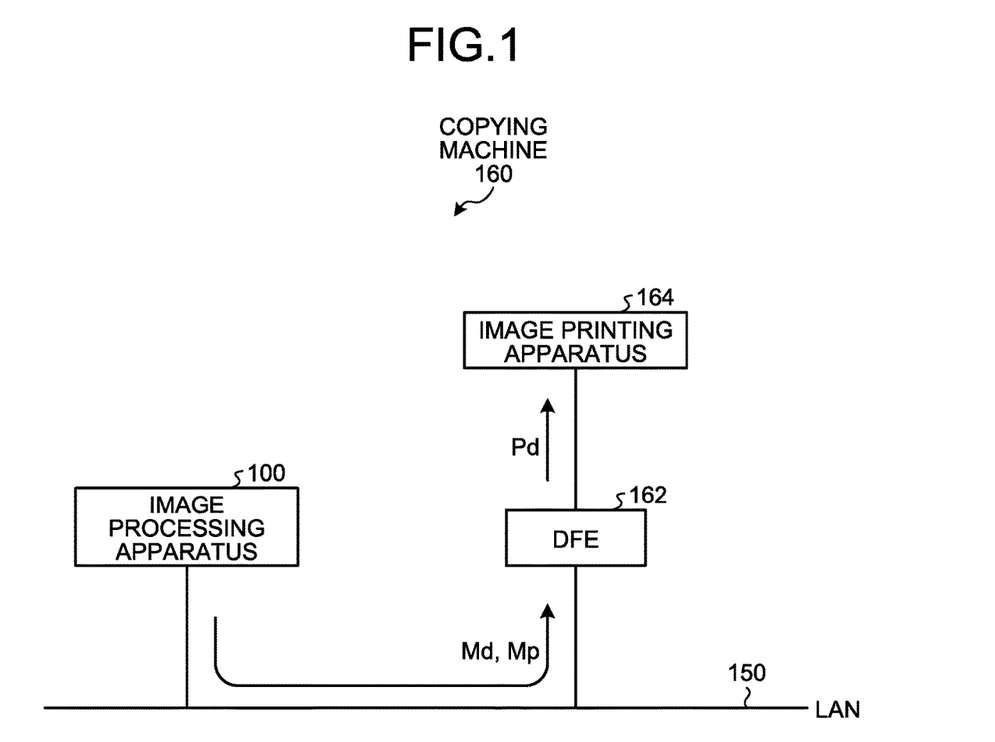
FIG. 1 is a hardware block diagram illustrating a hardware configuration of a copying machine according to an embodiment.

A hardware configuration of the image processing system according to the present embodiment will initially be described with reference to FIG. 1. FIG. 1 is a hardware block diagram illustrating the hardware configuration when the image processing system according to the present embodiment is applied to a copying machine 160. The copying machine 160 includes an image processing apparatus 100, a digital front end (DFE) 162, and an image printing apparatus 164.

The image processing apparatus 100 and the DFE 162 are connected to each other by a local area network (LAN) 150.

The image processing apparatus 100 obtains document data Md from an external computer or the like via the LAN 150. Alternatively, for example, the image processing apparatus 100 may be configured to read document data Md stored in a USB memory by using document reading means included in the image processing apparatus 100. The image processing apparatus 100 then specifies a print parameter Mp representing a print condition needed to print the document data Md, and thereby generates a preview image Pi (see FIG. 3) to be described later which simulates a print result of the document data Md. Details of the print parameter Mp and an internal configuration of the image processing apparatus 100 will be described later.

The DFE 162 performs processing such as rasterization for converting the document data Md into print data Pd of printable format, on the basis of the document data Md and the print parameter Mp specified by the image processing apparatus 100.

The image printing apparatus 164 prints and outputs the print data Pd by overlaying color materials in process colors CMYK and special color materials, such as white toner and clear toner, on a base material to be printed, such a paper medium, a transparent film, and a cloth medium. An example of the image printing apparatus 164 is a laser printer which forms an image on a recording sheet according to laser writing and electrophotographic processes.

Description of Hardware Configuration of Information Processing Apparatus

Figure 2:
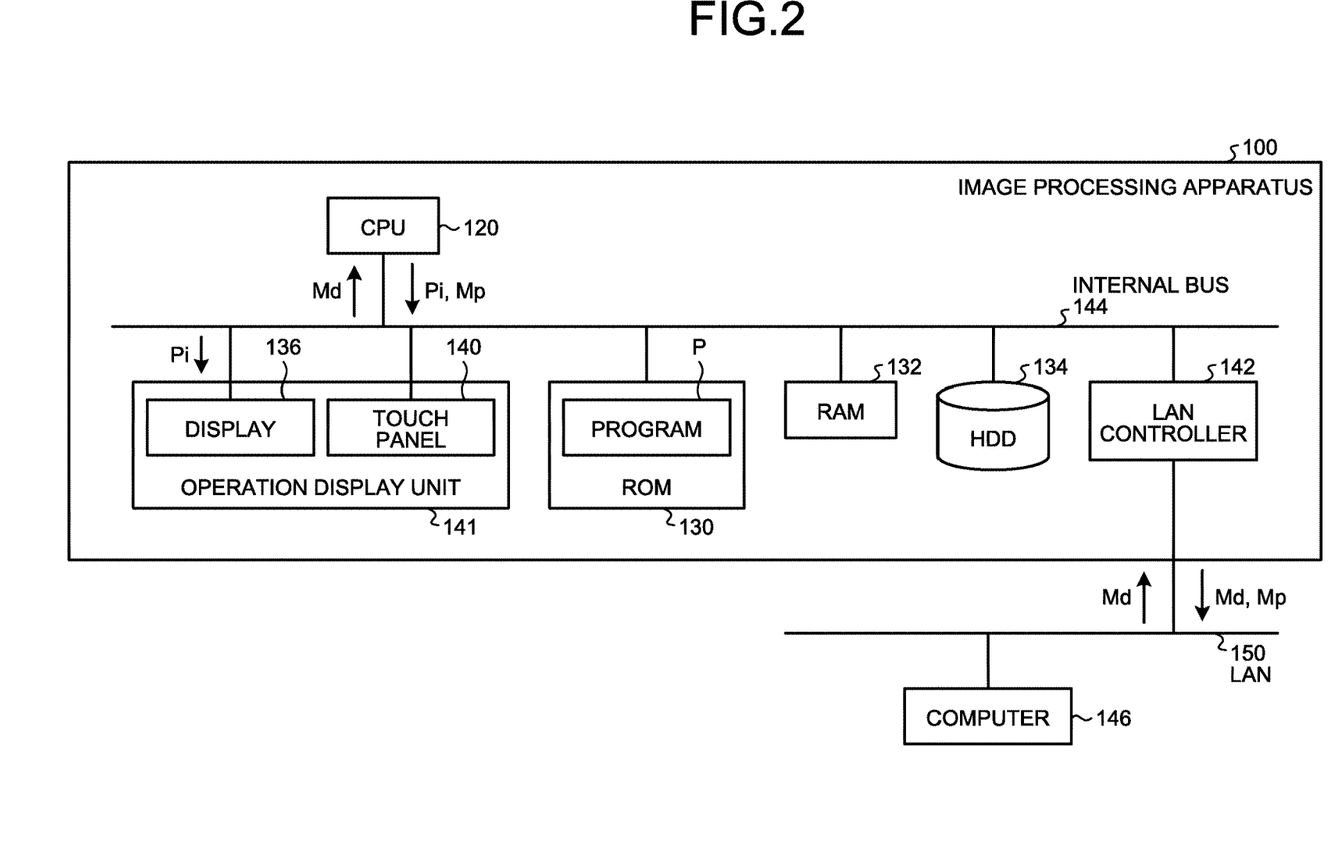
FIG. 2 is a hardware block diagram illustrating a hardware configuration of an image processing apparatus according to the embodiment.

Next, a hardware configuration of the image processing apparatus 100 will be described with reference to FIG. 2. FIG. 2 is a hardware block diagram illustrating the hardware configuration of the image processing apparatus 100 according to the embodiment. The image processing apparatus 100 includes a central processing unit (CPU) 120, a read only memory (ROM) 130, a random access memory (RAM) 132, a hard disk drive (HDD) 134, an operation display unit 141, and a LAN controller 142. In the image processing apparatus 100, the CPU 120 and the other pieces of hardware are connected to each other by an internal bus 144. The image processing apparatus 100 has a hardware configuration using an ordinary computer.

The CPU 120 operates according to a program P stored in the ROM 130 and obtains the document data Md from, for example, a computer 146. The CPU 120 then generates a preview image Pi simulating the print result of the obtained document data Md. The CPU 120 further functions as arithmetic means for controlling an operation of the entire image processing apparatus 100.

The ROM 130 is a read only memory which stores the program P for operating the CPU 120.

The RAM 132 is a writable and readable memory which functions as a main storage unit when the CPU 120 executes the program P. The program P read from the ROM 130 by the CPU 120 is loaded into the RAM 132, whereby functional units to be described later are generated in respective executable forms.

The foregoing program P may be configured to be recorded and provided as a file of installable format or executable format on a not-illustrated recording medium D readable to the CPU 120 (computer), instead of being stored in the ROM 130 in advance. Examples of the recording medium D include a CD-ROM, a flexible disk (FD), a CD-R, and a digital versatile disc (DVD).

The program P may be stored in the computer 146 connected to the LAN 150 and provided by downloading via the LAN 150 and the LAN controller 142. The program P may be configured to be provided or distributed via a network such as the Internet.

The HDD 134 functions as a storage (data storage unit) for previously storing data needed to generate a preview image Pi. Examples of the data include spectral reflection characteristics of respective types of base materials and color materials. The HDD 134 may be constituted by a flash memory.

The operation display unit 141 functions as an information input unit for the CPU 120 and an output monitor unit of the CPU 120. The operation display unit 141 includes a display 136 and a touch panel 140. For example, the display 136 includes a liquid crystal monitor, and functions as a display unit for displaying the preview image Pi. The display 136 further displays a user interface screen, or graphical user interface (GUI) screen, serving as an input screen for inputting information needed for the image processing apparatus 100 to generate the preview image Pi into the CPU 120.

The touch panel 140 functions as an information input unit for specifying the print parameter Mp and inputting the specified print parameter Mp into the CPU 120. The print parameter Mp is information needed for the image processing apparatus 100 to generate the preview image Pi.

The LAN controller 142 connects the image processing apparatus 100 with external apparatuses, such as the computer 146 and the image printing apparatus 164 of FIG. 1, via the LAN 150. The LAN controller 142 obtains the document data Md from the computer 146, and transmits the document data Md and the print parameter Mp to the DFE 162 of FIG. 1 via the LAN 150.

Description of Functional Configuration of Image Processing Apparatus

Figure 3:
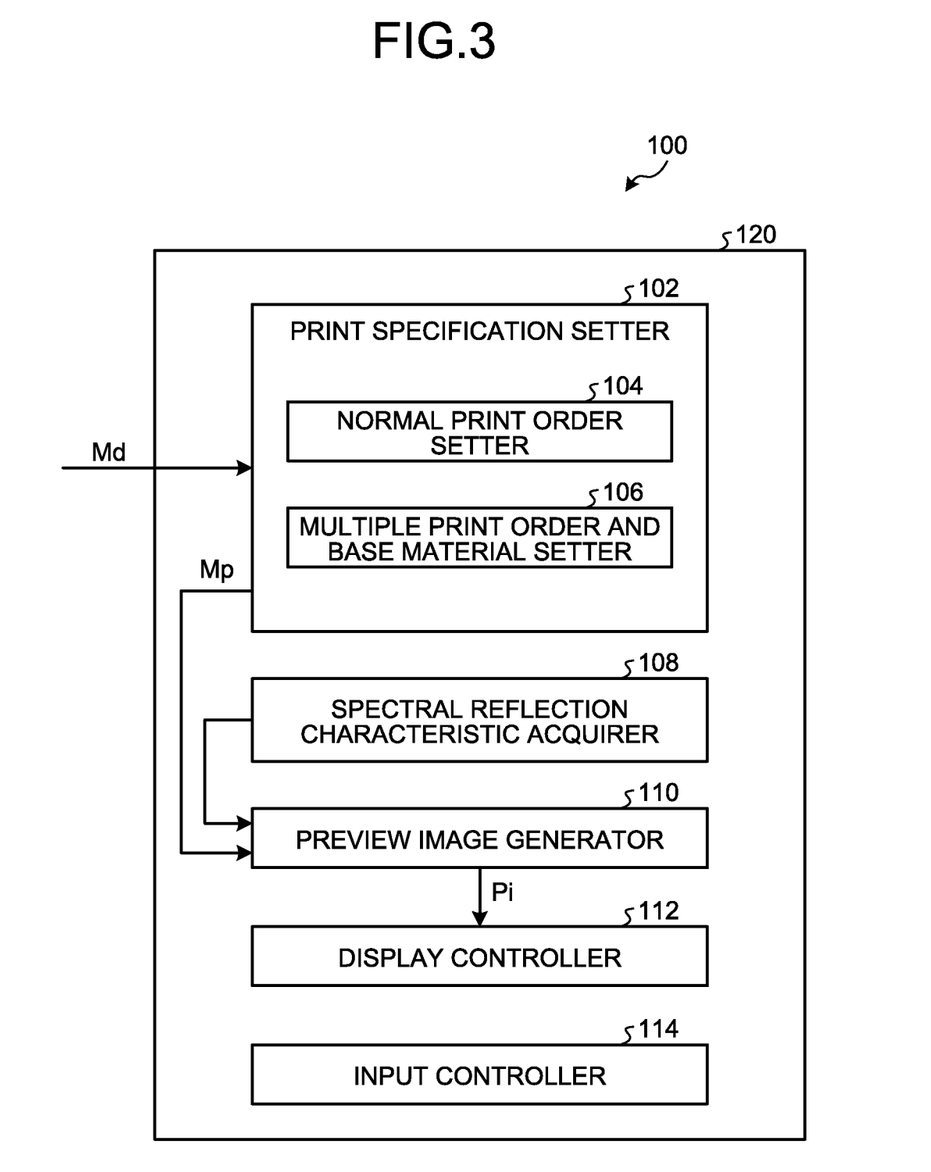
FIG. 3 is a schematic functional block diagram illustrating a functional configuration when the image processing apparatus performs preview image generation processing.

A functional configuration of the image processing apparatus 100 of FIG. 2 will be described below with reference to FIG. 3. FIG. 3 is a schematic functional block diagram illustrating the functional configuration when the CPU 120 performs preview image generation processing for generating the preview image Pi on the basis of the document data Md.

The CPU 120 reads the program P from the ROM 130 of FIG. 2 and executes the program P. Specifically, the CPU 120 executes the program P to generate a print specification setter 102, a spectral reflection characteristic acquirer 108, a preview image generator 110, a display controller 112, and an input controller 114 of FIG. 3 on the RAM 132 which is the main storage unit.

The print specification setter 102 sets the foregoing print parameter Mp. The print specification setter 102 includes a normal print order setter 104 and a multiple print order and base material setter 106. The print specification setter 102 sets a print condition in printing the document data Md. The print condition includes the types of color materials such as toners and inks, and the order of overlaying of the color materials. The print specification setter 102 also sets the number of repetitions (multiple print count) of normal printing based on the types of color materials and the order of overlaying of the color materials specified, or the type of base material to be printed, as the print parameter Mp. As employed herein, multiple printing refers to a printing method for repeating normal printing to achieve printing of higher density or higher vividness.

The normal print order setter 104 sets the types of color materials and the order of overlaying of the color materials in printing the document data Md on the basis of an operator's instructions.

The multiple print order and base material setter 106 sets the number of repetitions of normal printing based on the types of color materials and the order of overlaying of the color materials set by the normal print order setter 104 and the type of base material according to the operator's instructions. The multiple print order and base material setter 106 here can set a transparent film as the base material. If the transparent film is specified, the multiple print order and base material setter 106 can also set which surface of the transparent film to print, the front surface or the back surface.

The display controller 112 displays the GUI screen to be described later on the display 136 of FIG. 2 to assist the operator's operations for specifying the print condition. The display controller 112 also displays the preview image Pi generated by the image processing apparatus 100 on the display 136.

The input controller 114 obtains information input to the touch panel 140 of FIG. 2 by the operator when the normal print order setter 104 and the multiple print order and base material setter 106 set the information needed to generate the preview image Pi.

The spectral reflection characteristic acquirer 108 acquires spectral reflection characteristics from the HDD 134 of FIG. 2 on the basis of the types of color materials set by the normal print order setter 104 and the type of base material set by the multiple print order and base material setter 106. The spectral reflection characteristics are spectral reflectance data indicating the wavelength-by-wavelength reflectance of the color materials and base material set.

The preview image generator 110 performs the preview image generation processing for generating the preview image Pi simulating the print result of the document data Md. The preview image generator 110 performs the preview image generation processing on the basis of the document data Md, the print parameter Mp set by the normal print order setter 104 and the multiple print order and base material setter 106, and the spectral reflection characteristics of the base material and the color materials acquired by the spectral reflection characteristic acquirer 108. A specific method for generating the preview image Pi will be described later.

Figure 4:
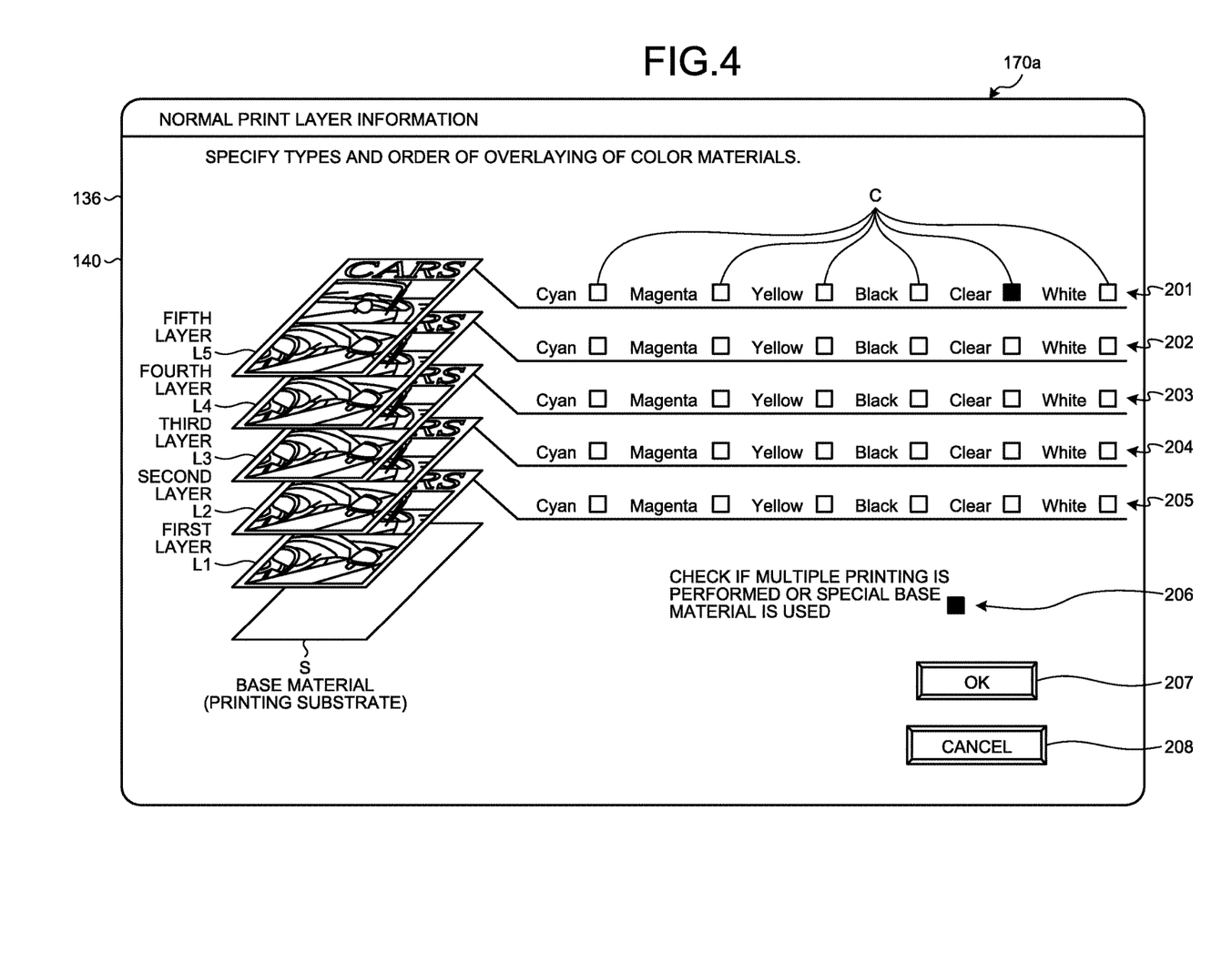
FIG. 4 is a diagram illustrating an example of a GUI screen for specifying types of color materials and order of overlaying thereof.
Figure 5:
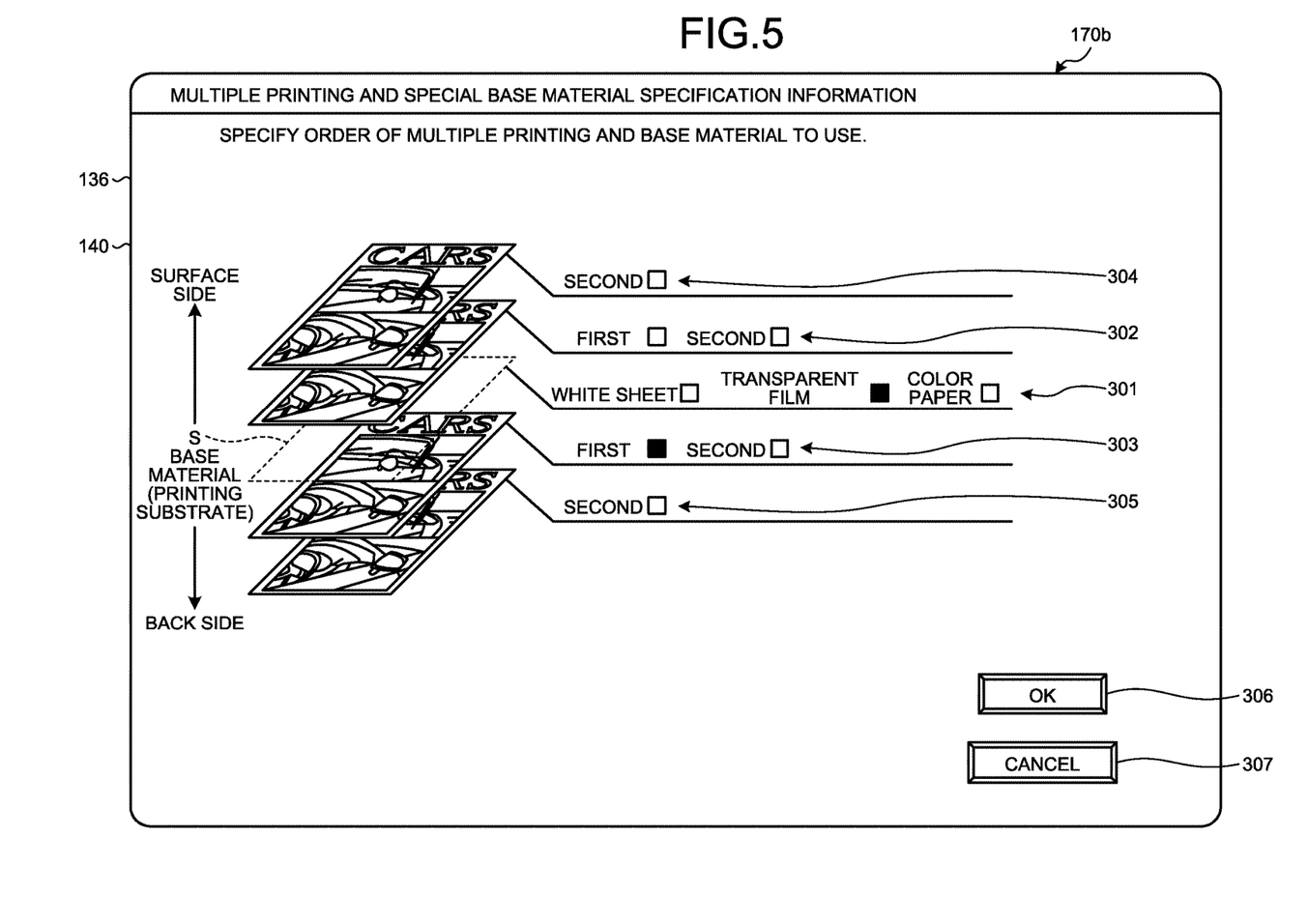
FIG. 5 is a diagram illustrating an example of a GUI screen for specifying a type of base material and multiple print order.

Description of Method for Specifying Information Needed to Generate Preview Image Next, a method for specifying the print parameter Mp which is information needed to generate the preview image Pi will be described with reference to FIGS. 4 and 5. FIG. 4 is a diagram illustrating an example of a GUI screen 170a which the normal print order setter 104 generates and the display controller 112 displays on the display 136 of FIG. 2 when specifying the types of color materials used in a normal print operation and the order of overlaying of the color materials. FIG. 5 is a diagram illustrating an example of a GUI screen 170b which the multiple print order and base material setter 106 generates and the display controller 112 displays on the display 136 of FIG. 2 when specifying the type of base material used in performing printing and the multiple print count on the front or back surface of the base material.

The GUI screen 170a illustrated in FIG. 4 is an example in which the types of color materials to be overlaid on the surface of a printing substrate S, which is the base material, and the order of overlaying of the layers of the color materials in a print operation can be specified within the range of up to five layers.

The operator of the image processing apparatus 100 views the GUI screen 170a and operates the touch panel 140 to specify the types of color materials to be laid in the respective layers (L1, L2, L3, L4, and L5) and the order of overlaying of the color materials. In the example of the GUI screen 170a, color materials to be used are selected from a total of six color materials. The six color materials include four color materials C, M, Y, and K, which are process colors used in ordinary color printing, and two color materials clear and white, which are special color materials for producing effects such as high glossiness. The GUI screen 170a is configured to specify the order of overlaying of the color materials in performing printing on the front surface of the printing substrate S. This GUI screen 170a is also used to specify the order of overlaying of color materials in performing printing on the back surface of the printing substrate S. Which surface of the printing substrate S to print, the front surface of the back surface, is specified afterward.

The layers (L1, L2, L3, L4, and L5) of FIG. 4 have respective check fields (201, 202, 203, 204, and 205). The check fields (201, 202, 203, 204, and 205) each include checkboxes Cb for respective types of color materials. The operator of the image processing apparatus 100 selects a checkbox Cb representing the color material to be laid in each layer (L1, L2, L3, L4, or L5). The types of color materials to be laid in the respective layers (L1, L2, L3, L4, and L5) are selected by checking corresponding checkboxes Cb.

The GUI screen 170a illustrates an example in which the clear color material is selected to be laid in the layer L5, the farthest layer from the surface of the printing substrate S. The operator similarly selects the types of color materials to be laid in the other layers (L1, L2, L3, and L4). The selections may be input in arbitrary order. If not all the five layers need to be laid, the operator may select layers only as many as needed.

A check field 206 is one for instructing the multiple print order and base material setter 106 to repeat the details selected on the GUI screen 170a to be performed in one print operation a plurality of times, i.e., perform so-called multiple printing, or to use a special base material as the printing substrate S. If the operator checks the check field 206, the multiple print order and base material setter 106 requests the operator to select the type of base material and the number of times of multiple printing as will be described later. If a transparent film is selected as the printing substrate S, the multiple print order and base material setter 106 requests the operator to select which side of the transparent film to print, the front surface or the back surface.

An OK button 207 is a button for instructing the normal print order setter 104 that the settings input to the GUI screen 170a are correct. Specifically, if the operator of the image processing apparatus 100 selects the OK button 207, the normal print order setter 104 is notified that the selections made on the GUI screen 170a are correct.

A cancel button 208 is a button for instructing the normal print order setter 104 that a modification needs to be made to the selections made on the GUI screen 170a. If the cancel button 208 is pressed, the normal print order setter 104 is notified that the items selected on the GUI screen 170a include an item or items to be modified. After the pressing of the cancel button 208, the operator re-selects the types of color materials and the order of overlaying of the color materials on the GUI screen 170a.

The selection operations illustrated in FIG. 4 may be made other than in a checkbox manner. A user interface (UI) may be configured to change the order of overlaying of thumbnail images formed by the respective color materials by a drag-and-drop operation on the touch panel 140.

If the check field 206 of the GUI screen 170a is checked, the multiple print order and base material setter 106 generates the GUI screen 170b illustrated in FIG. 5. The display controller 112 displays the GUI screen 170b on the display 136. If the OK button 207 is pressed without the check field 206 being checked, a predetermined printing substrate, for example, a white sheet is used as the printing substrate S. Normal printing is then performed on the surface of the white sheet by using the types of color materials and in the order of overlaying set on the GUI screen 170a.

The GUI screen 170b illustrated in FIG. 5 is for specifying the type of base material (white sheet, transparent film, or color paper) and on which surface of the base material, the front surface or the back surface, to perform printing based on the order of overlaying of the color materials specified on the GUI screen 170a. In the illustrated example, the number of repetitions of the printing can be specified within the range of up to twice. The GUI screen 170b is displayed if the check field 206 is checked on the foregoing GUI screen 170a.

The GUI screens 170b includes a check field 301 to select the base material, check fields 302 and 304 for specifying what number of printing to perform on the surface of the base material, and check fields 303 and 305 for specifying what number of printing to perform on the back surface of the base material.

For example, if the first printing in the order of overlaying selected on the GUI screen 170a is performed on the back side of a transparent film, "transparent film" in the check field 301 is selected and "first" in the check field 303 is selected.

An OK button 306 is a button for transitioning to next processing if the settings input to the GUI screen 170b are correct. A cancel button 307 is a button for canceling the settings.

The selection operations illustrated in FIG. 5 may be made other than in a check-field manner. A UI may be configured to change the order of overlaying of a thumbnail image representing the type of base material and thumbnail images formed in respective print operations by using a drag-and-drop operation on the touch panel 140.

Description of Preview Image Generation Processing

Next, details of the preview image generation processing performed by the preview image generator 110 will be described. For ease of description, the document data Md will be described to be input as data of CMYK+α (clear, white) format inherent to the image printing apparatus 164, instead of being data of standard CMYK format such as Japan Color.

Suppose that the CMYK+α document data Md expresses a halftone dot % of each of the CMYK+α versions at each pixel of the document data Md. Each component takes a value of 0% to 100%. The values of the halftone dot %'s, converted into the range of 0 to 1, will be denoted by $a_c$, $a_m$, $a_y$, $a_k$, and $a_\alpha$, respectively. The spectral reflectances of the colors C, M, Y, K, and α when the respective 100% solid colors (halftone dot area of 100%) are printed on white paper will be denoted by $R_c(\lambda)$, $R_m(\lambda)$, $R_y(\lambda)$, $R_k(\lambda)$, and $R_\alpha(\lambda)$, respectively. The spectral reflectance of the base material will be denoted by $R_p(\lambda)$.

The halftone dot % values $a_c$, $a_m$, $a_y$, $a_k$, and $a_\alpha$, the spectral reflectances $R_c(\lambda)$, $R_m(\lambda)$, $R_y(\lambda)$, $R_k(\lambda)$, and $R_\alpha(\lambda)$ of the respective colors, and the spectral reflectance $R_p(\lambda)$ of the base material are stored in the HDD 134 of FIG. 2 in advance.

Using such values, predicted spectral reflectances $R_c'(\lambda)$, $R_m'(\lambda)$, $R_y'(\lambda)$, $R_k'(\lambda)$, and $R_\alpha'(\lambda)$ of the colors are calculated by Equations (1) to (5), respectively:

$$R_c'(\lambda) = \{(1-a_c)R_p(\lambda)^{1/n} + a_c \cdot R_c(\lambda)^{1/n}\}^n \quad (1)$$

$$R_m'(\lambda) = \{(1-a_m)R_p(\lambda)^{1/n} + a_m \cdot R_m(\lambda)^{1/n}\}^n \quad (2)$$

$$R_y'(\lambda) = \{(1-a_y)R_p(\lambda)^{1/n} + a_y \cdot R_y(\lambda)^{1/n}\}^n \quad (3)$$

$$R_k'(\lambda) = \{(1-a_k)R_p(\lambda)^{1/n} + a_k \cdot R_k(\lambda)^{1/n}\}^n \quad (4)$$

$$R_\alpha'(\lambda) = \{(1-a_\alpha)R_p(\lambda)^{1/n} + a_\alpha \cdot R_\alpha(\lambda)^{1/n}\}^n \quad (5)$$

Equations (1) to (5) are prediction formulas of spectral reflectance, proposed by Yule-Nielsen. The constant n in Equations (1) to (5) is an empirically-determined value, and takes a value of approximately 1 to 4. Suppose here that n=3.

The predicted spectral reflectances $R_c'(\lambda)$, $R_m'(\lambda)$, $R_y'(\lambda)$, $R_k'(\lambda)$, and $R_\alpha'(\lambda)$ of the respective colors calculated by Equations (1) to (5) are divided by the spectral reflectance $R_p(\lambda)$ of the base material to determine spectral transmittances when the color materials of the different colors are regarded as a uniform medium. The spectral transmittances of the respective colors thus calculated are multiplied by each other and then by the spectral reflectance $R_p(\lambda)$ of the base material to determine the spectral reflectance $R'(\lambda)$ of the document data Md, which is given by Equation (6):

$$R'(\lambda) = (R_c'(\lambda)/R_p(\lambda)) \cdot (R_m'(\lambda)/R_p(\lambda)) \cdot (R_y'(\lambda)/R_p(\lambda)) \cdot (R_k'(\lambda)/R_p(\lambda)) \cdot (R_\alpha'(\lambda)/R_p(\lambda)) \cdot R_p(\lambda) \quad (6)$$

The preview image generator 110 calculates XYZ three stimulus values by multiplying the spectral reflectance $R'(\lambda)$ of the document data Md calculated by Eq. 6 by the CIE (Commission Internationale de l'Eclairege) XYZ color matching functions. The preview image generator 110 converts the calculated XYZ three stimulus values into RGB values, assuming the color space sRGB or Adobe RGB (Adobe is a registered trademark), to calculate the RGB values of the preview image Pi. The preview image generator 110 performs similar calculations on all the pixels of the document data Md to generate the preview image Pi.

While the document data Md is described to be simply used as having CMYKα values, halftone dot %'s experimentally determined in advance and effective area ratios in consideration of dot gains such that a printed product looks darker in color than the actual print data may be stored in the HDD 134. Using the stored halftone dot %'s and effective area ratios, a conversion from halftone dot %'s into area ratios may be performed to improve the prediction accuracy of the preview image Pi.

Description of Horizontal Flip Processing of Document Data

Next, horizontal flip processing of the document data Md, which is performed in printing the document data Md on the back surface of a transparent film, will be described.

If the base material is a transparent film and the document data Md is printed on the back surface of the transparent film, the document data Md needs to be overlaid in a horizontally flipped state, or a correct preview image Pi cannot be obtained as seen from the surface side of the transparent film. Image processing for reversing the order of horizontal arrangement of the pixels is therefore performed on the document data Md.

The document data Md includes a two-dimensional matrix of individual pixels. The address of an arbitrary pixel of the document data Md can be expressed in a two-dimensional form or one-dimensional form.

Suppose that an address representing each pixel of the document data Md is expressed in a row-by-column two-dimensional form. In such a case, the horizontal arrangement of data in the document data Md can be arranged in reverse order by performing processing for sorting the addresses expressing horizontal positions in horizontally reverse order among the two-dimensional addresses. The addresses expressing vertical positions will not be changed.

Suppose, for example, that the document data Md includes M pixels in the horizontal direction and N pixels in the vertical direction. The horizontal coordinate of an arbitrary pixel G of the document data Md will be denoted by x, and the vertical coordinate y. In other words, the coordinates of the pixel G are expressed as G(x, y) ($0 \leq x \leq (M-1)$, $0 \leq y \leq (N-1)$). The coordinates of a pixel G' corresponding to the pixel G in rearranged document data Md' obtained by rearranging the document data Md in horizontally reverse order will be denoted by G'(X, Y). The coordinates X and Y can be calculated by Equations (7) and (8), respectively:

$$X = M - x - 1 \, (0 \le x \le (M-1)) \quad (7)$$

$$Y = y \, (0 \le y \le (N-1)) \quad (8)$$

Now, suppose that the document data Md includes M pixels in the horizontal direction and N pixels in the vertical directions, and an address representing each pixel of the document data Md is expressed in a one-dimensional form. For example, the coordinate of an arbitrary pixel H of the document data Md will be expressed as H(u) (0≤u≤(MN−1)). The coordinate of a pixel H' corresponding to the pixel H in the rearranged document data Md' obtained by rearranging the document data Md in horizontally reverse order will be denoted by H'(U). U can be calculated by Equation (9):

$$U = 2M \times \text{int}(u/M) + M - u - 1 \quad (9)$$

where int(Z) represents a maximum integer not greater than Z. In such a manner, the horizontal flip processing of the document data Md can be performed by a method based on the expression form of the pixels of the document data Md.

Description of Flow of Processing Performed by Image Processing Apparatus

Figure 6:
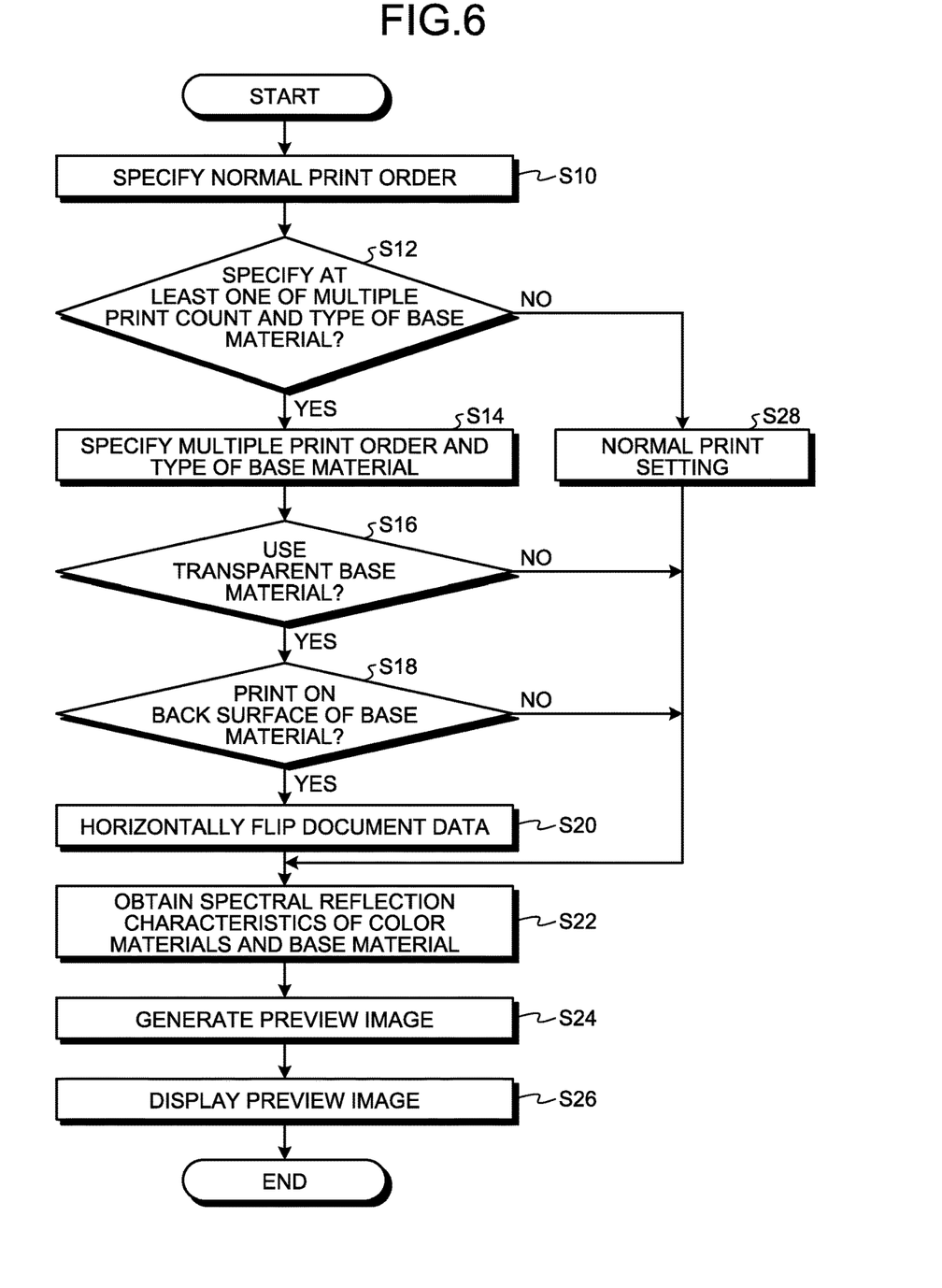
FIG. 6 is a flowchart illustrating a flow of the preview image generation processing.

Next, a flow of the preview image generation processing performed by the image processing apparatus 100 will be described with reference to the flowchart of FIG. 6.

The normal print order setter 104 generates the GUI screen 170a of FIG. 4. The display controller 112 displays the generated GUI screen 170a on the display 136. The normal print order setter 104 then specifies the types of color materials and the order of overlaying of the color materials, or normal print order, on the basis of information that is input on the GUI screen 170a by the operator (step S10).

The normal print order setter 104 checks whether to specify at least one of a multiple print count and the type of base material (step S12). Specifically, the normal print order setter 104 checks whether the check field 206 of the GUI screen 170a (FIG. 4) is checked. If the check field 206 is checked (step S12; Yes), the processing proceeds to step S14. If not (step S12; No), the processing proceeds to step S28.

The multiple print order and base material setter 106 generates the GUI screen 170b of FIG. 5. The display controller 112 displays the generated GUI screen 170b on the display 136. The multiple print order and base material setter 106 then specifies multiple print order and the type of base material on the basis of information that is input on the GUI screen 170b by the operator (step S14).

The multiple print order and base material setter 106 checks whether the transparent film checkbox in the check field 301 of the GUI screen 170b is checked (step S16). If the transparent film checkbox is checked (step S16; Yes), a transparent base material is determined to be printed. The processing proceeds to step S18. If not (step S16; No), the processing proceeds to step S22.

The multiple print order and base material setter 106 checks whether the check field 303 or the check field 305 of the GUI screen 170b is checked (step S18). If the check field 303 or the check field 305 is checked (step S18; Yes), the back surface of the base material is determined to be printed. The processing proceeds to step S20. If not (step S18; No), the processing proceeds to step S22.

The preview image generator 110 horizontally flips the document data Md (step S20).

The preview image generator 110 obtains the spectral reflection characteristics of the color materials and the base material from the HDD 134 (step S22).

The preview image generator 110 generates a preview image Pi (step S24).

The display controller 112 displays the preview image Pi on the display 136 (step S26). The processing of FIG. 6 ends.

In step S12, if the check field 206 is not checked (step S12; No), the normal print order setter 104 makes settings to perform normal printing as specified in step S10 (step S28). The processing then proceeds to step S22.

As described above, according to the image processing apparatus 100 of the present embodiment, the normal print order setter 104 specifies the types of color materials used in printing the document data Md on a base material, and the order of overlaying of the color materials during printing. The multiple print order and base material setter 106 specifies at least one of the number of repetitions of normal printing based on the types of color materials and the order of overlaying of the color materials specified by the normal print order setter 104 and the type of base material. The preview image generator 110 then generates a preview image Pi simulating a print result of the document data Md on the basis of the information specified by the normal print order setter 104 and the multiple print order and base material setter 106. As a result, a preview image Pi according to various printing conditions, including the type of base material, the types of color materials, the order of overlaying of the color materials, and the number of repetitions of normal printing, can be generated. The print result according to the order of overlaying of the color materials and the base material can thus be checked before printing.

According to the image processing apparatus 100 of the present embodiment, the preview image generator 110 horizontally flips and overlays the document data Md on the back side of the base material if the multiple print order and base material setter 106 specifies a transparent film as the base material and specifies that the document data Md is printed on the back side of the transparent film. Even if printing is performed on the back side of the transparent film, the document data Md can thus be previewed in a correct horizontal direction on the generated preview image Pi.

In the copying machine 160 (image processing system) according to the present embodiment, the image printing apparatus 164 prints the document data Md according to the print condition set as the print parameter Mp by the image processing apparatus 100. The document data Md can thus be printed as print data Pd.

The program P recorded on the recording medium D readable to the CPU 120 (computer) is provided for the image processing apparatus 100 according to the present embodiment. This can improve the portability of the program P.

Figure 7:
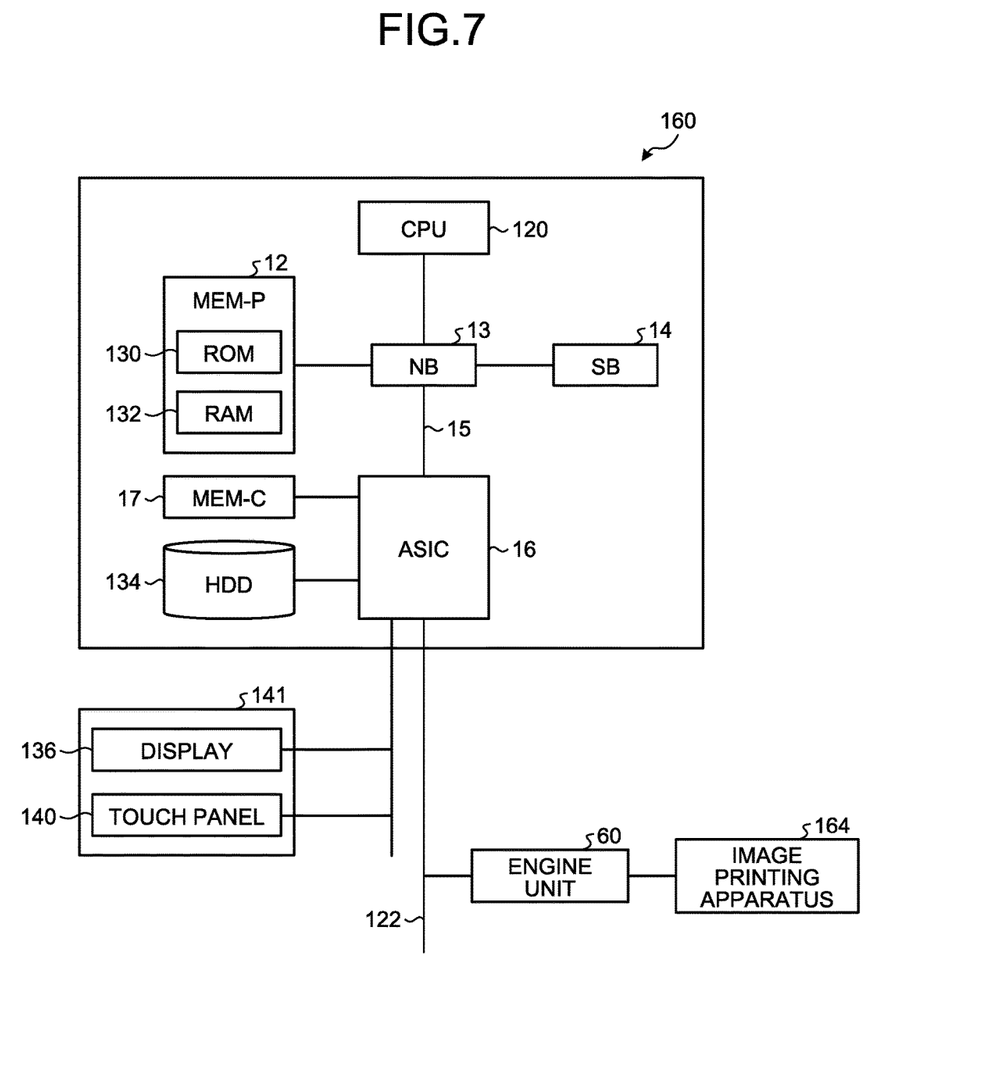
FIG. 7 is a hardware block diagram illustrating a hardware configuration of the copying machine.

In the foregoing image processing apparatus 100, the functions implemented by the arithmetic means, or CPU 120, operating according to the program P may be implemented by hardware dedicated to image processing. FIG. 7 is a hardware block diagram illustrating a hardware configuration of the copying machine 160.

The image processing apparatus 100 illustrated in FIG. 7 is connected to an engine unit 60 by a PCI bus 122. An example of the engine unit 60 is a printer engine for operating the image printing apparatus 164. The image processing apparatus 100 includes the CPU 120, a north bridge (NB) 13, a system memory (MEM-P) 12, a south bridge (SB) 14, a local memory (MEM-C) 17, an application specific integrated circuit (ASIC) 16, and the HDD 134. The north bridge (NB) 13 and the ASIC 16 are connected by an accelerated graphic port (AGP) bus 15. The MEM-P 12 includes the ROM 130 and the RAM 132.

The CPU 120 performs overall control on the image processing apparatus 100. The CPU 120 has a chipset including the NB 13, the MEM-P 12, and the SB 14, and is connected with other devices via the chipset.

The NB 13 is a bridge for connecting the CPU 120 with the MEM-P 12, the SB 14, and the AGP bus 15. The NB 13 includes a memory controller, a PCI master, and an AGP target. The memory controller controls a read, write, and other operations to the MEM-P 12.

The MEM-P 12 is a memory for storing programs and data. The ROM 130 and the RAM 132 have the respective functions described in FIG. 2.

The SB 14 is a bridge for connecting the NB 13 with PCI devices and peripheral devices. The SB 14 is connected to the NB 13 via the PCI bus.

The ASIC 16 is an integrated circuit (IC) intended for image processing purposes, and includes hardware elements for image processing. The ASIC 16 has a bridge function for connecting the AGP bus 15, the PCI bus, the HDD 134, and the MEM-C 17 with each other. The ASIC 16 includes a PCI target, an AGP master, an arbiter (ARB), a memory controller, a plurality of direct memory access controllers (DMACs), and a PCI unit. The ARB is the core of the ASIC 16. The memory controller controls the MEM-C 17. The plurality of DMACs performs calculations on the document data Md by using hardware logic and the like. The PCI unit performs data transfer with the engine unit 60 via the PCI bus.

The ASIC 16 is connected with the display 136 and the touch panel 140 which serve as the operation display unit 141.

Having the foregoing configuration, the ASIC 16 functions as the image processing apparatus 100 described in the embodiment. The ASIC 16 then performs, by hardware, the functions of the print specification setter 102, the spectral reflection characteristic acquirer 108, and the preview image generator 110 of FIG. 3 which are, in the embodiment, performed by the CPU 120 according to the program P.

The MEM-C 17 is a local memory used as a copy image buffer and a coding buffer. The HDD 134 is a storage for storing image data, programs, font data, and forms.

The AGP bus 15 is a bus interface intended for a graphic accelerator card for accelerating graphics processing. The AGP bus 15 operates the graphic accelerator card at high speed by making high-throughput direct access to the MEM-P 12.

The foregoing embodiment has been described by using an example in which the image processing apparatus according to the present invention is applied to a copying machine. However, the present invention may be applied to any image processing apparatus that includes functions such as those of a printer, a scanner apparatus, a facsimile apparatus, and the like.

According to an embodiment, a preview image according to various print conditions, namely, the types of color materials, the order of overlaying of the color materials, the number of repetitions of printing, and the type of base material can be generated. A print result according to the order of overlaying of the color materials with respect to the base material can thus be checked before printing.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:
    a normal print order setter configured to set types of color materials used in printing document data on a base material, and order of overlaying of the color materials during printing;
    a multiple print order and base material setter configured to set at least one of a number of repetitions of printing based on the types of color materials and the order of overlaying of the color materials and a type of base material; and
    a preview image generator configured to generate a preview image simulating a print result of the document data on a basis of information set by the normal print order setter and the multiple print order and base material setter;
    wherein the preview image generator horizontally flips and overlays the document data on a back side of the base material under conditions that the multiple print order and base material setter sets a transparent film as the base material and sets that the document data is printed on the back side of the transparent film.

2. An image processing system comprising:
    the image processing apparatus according to claim 1; and
    an image printing apparatus configured to print the document data under a print condition set by the image processing apparatus.

3. An image processing method performed by the image processing apparatus according to claim 1, the image processing method comprising:
    setting types of color materials used in printing document data on a base material, and order of overlaying of the color materials during printing;
    setting at least one of a number of repetitions of printing based on the types of color materials and the order of overlaying of the color materials and a type of base material; and
    generating a preview image simulating a print result of the document data on a basis of information set by the normal print order setter and the multiple print order and base material setter;
    wherein the generating of the preview image includes horizontally flipping and overlaying the document data on a back side of the base material under conditions that the type of the base material is set to a transparent film and that the document data is set to print on the back side of the transparent film.

4. A non-transitory computer-readable recording medium with an executable program stored thereon, wherein the program instructs a computer to perform:
    setting types of color materials used in printing document data on a base material, and order of overlaying of the color materials during printing;
    setting at least one of a number of repetitions of printing based on the types of color materials and the order of overlaying of the color materials and a type of base material; and
    generating a preview image simulating a print result of the document data on a basis of information set at the settings;
    wherein the generating of the preview image includes horizontally flipping and overlaying the document data on a back side of the base material under conditions that the type of the base material is set to a transparent film and that the document data is set to print on the back side of the transparent film.

* * * * *